United States Patent Office 2,987,398
Patented June 6, 1961

2,987,398
COUMESTROL ETHERS AND USE THEREOF
Emanuel M. Bickoff and Albert N. Booth, Berkeley, Calif., assignors to the United States of America as represented by the Secretary of Agriculture
No Drawing. Filed May 12, 1958, Ser. No. 734,802
20 Claims. (Cl. 99—2)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to coumarin derivatives, processes of synthesizing them, and methods and compositions for practical utilization of these compounds. The objects of the invention include the provision of novel methods for synthesizing coumestrol ethers, the provision of animal feeds and other compositions containing these ethers, and the provision of methods for producing and utilizing such compositions. Further objects and advantages of the invention will be evident from the description herein.

In our copending patent application of E. M. Bickoff and A. N. Booth, Serial No. 693,785, filed Oct. 31, 1957, now Patent No. 2,890,116, there is disclosed a previously unknown compound and methods for isolating it from forage crops such as ladino clover, alfalfa, etc. It is also disclosed that the compound exhibits estrogenic activity and may be employed in animal raising to obtain increased weight gain and increased efficiency of feed utilization. The compound in question has been named coumestrol and structurally it is 7',6-dihydroxycoumarino (3',4'-3,2)-coumarone having the formula—

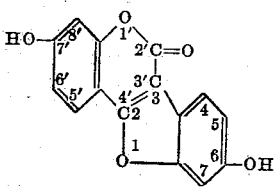

This compound will be referred to herein as coumestrol for the sake of brevity without loss of accuracy.

It has now been found that the ethers of coumestrol constitute valuable estrogenic agents. Moreover, these ethers possess significant advantages over coumestrol in that they are more stable and are more readily produced in pure, crystalline form than coumestrol. The ethers exhibit essentially the same estrogenic activity as coumestrol and may be employed in analogous manner in animal raising as further explained below.

The invention encompasses the mono- and di-ethers of coumestrol. These compounds may be represented by the formula—

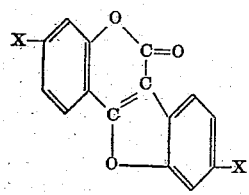

wherein one of the X's represents a member of the group consisting of —OH and —OR, the other X represents —OR, and wherein —OR represents an ether group. The ether group or groups may be aliphatic, aromatic, aromatic-aliphatic or cycloaliphatic. Typical values for R, by way of example, are: methyl, ethyl, isopropyl, propyl, n-butyl, 2-butyl, 2-methypropyl, tert.-butyl, hexyl, octyl, decyl, dodecyl, 2-ethoxyethyl, 2-phenoxyethyl, 2-benzoxyethyl, benzyl, methylbenzyl, isopropyl benzyl, ethoxybenzyl, phenoxybenzyl, phenyl, tolyl, anisyl, cyclohexyl, etc.

In accordance with the invention, coumestrol ethers may be readily prepared by etherifying coumestrol. A preferred embodiment of the process is set forth below by way of illustration but not limitation:

Example 1

A mixture of 50 mg. coumestrol, 250 ml. acetone, and 2 g. potassium carbonate was refluxed on the steam bath under an atmosphere of nitrogen and while applying mechanical agitation. Dimethyl sulphate was added dropwise to the refluxing system until a total of 4 ml. had been added. After 45 minutes the reaction was completed and the reaction mixture was made alkaline with 6 N sodium hydroxide to hydrolyze residual dimethyl sulphate. The reaction mixture was then acidified with 6 N hydrochloric acid and the solids were filtered off and dissolved in 150 ml. acetone. The acetone solution was reduced to dryness under vacuum and the residue was recrystallized from methanol. The product, coumestrol dimethyl ether, was obtained in a yield of 48 mg. and had a melting point of 200–201° C. The product may also be termed 7',6-dimethoxycoumarino (3',4'-3,2)-coumarone.

It will be found in a practice of the process exemplified above that many variations may be followed within the scope of the invention. Thus the etherification may be effectuated with any desired etherification agent. Particularly preferred are the aliphatic, aromatic, aromatic-aliphatic, or cycloaliphatic bromides, iodides, chlorides, or sulphates. It is obvious that by selection of the etherifying agent any desired ether of coumestrol can be synthesized. For example, the use of methyl bromide or dimethyl sulphate will yield the methyl ether, the use of ethyl bromide or diethyl sulphate will yield the ethyl ethers. Illustrative examples of suitable etherifying agents are represented by the formula

R—X wherein X represents a halogen atom such as bromine, iodine, or chlorine and R represents an aliphatic, aromatic, aromatic-aliphatic, or cycloaliphatic radical such as methyl, ethyl, propyl, isopropyl, n-butyl, 2-butyl, 2-methylpropyl, tert. butyl, hexyl, octyl, decyl, dodecyl, 2-ethoxyethyl, 2-phenoxyethyl, 2-benzoxyethyl, benzyl, methylbenzyl, isopropylbenzyl, ethoxybenzyl, phenoxybenzyl, phenyl, tolyl, anisyl, cyclohexyl, and the like. Instead of the halides one can employ the corresponding sulphates, such as dimethyl sulphate, di-ethyl sulphate, di-isopropyl sulphate, or any other sulphate containing the radicals listed above.

The etherification agent may be employed in equimolecular proportion to favor the formation of the mono-ether or in twice this proportion, or preferably an excess thereover, to favor the formation of the di-ether. The etherification is conducted under essentially anhydrous conditions and preferably in the presence of sufficient inert solvent to dissolve the organic reactants and hence promote intimate contact therebetween. Suitable solvents are for example acetone, methyl ethyl ketone, diethyl ketone, etc. The temperature of etherification is not critical and may be varied from about 20 to 100° C. Usually the reaction is carried out at about 60° C. to expedite ether formation without causing thermal decomposition. Usually it is preferred to carry out the reaction under the reflux employing a solvent such as acetone.

To promote the etherification is is prefered to add an alkaline agent to the reaction mixture. Suitable for this purpose are potassium hydroxide, posassium carbonate, sodium carbonate, sodium hydroxide, borax, etc. In any event the alkaline material should be in essentially anhydrous condition to avoid introducing moisture into the system. The amount of alkaline material should be approximately that required to neutralize the hydrogen halide (or sulphuric acid, or partial ester thereof) released in the etherification.

The coumestrol ethers may also be prepared directly by cyclization of coumarin derivatives rather than by etherification of coumestrol. For example (Reaction I) coumestrol di-methyl ether may be prepared by reacting 3-(2, 4-dimethoxyphenyl)-4-hydroxy, 7-methoxy coumarin with conc. hydrobromic acid at about 75–125° C. to establish an oxygen linkage between the 4 carbon atom in the coumarin ring and that at position 2 on the phenyl ring without splitting the methoxyl at position 7 on the coumarin ring and that at position 4 on the phenyl ring. The coumestrol mono-ethers may be synthesized in analogous manner. Thus in accordance with the Reaction II, 3(2,4-dimethoxyphenyl)-4,7-dihydroxy coumarin may be cyclized to produce 7'-hydroxy-6-methoxycoumarino (3',4'-3,2) coumarone and in accordance with Reaction III, 3(2-methoxy, 4 hydroxyphenyl)-4-hydroxy, 7-methoxy coumarin may be cyclized to produce 7'-methoxy, 6-hydroxy-coumarino (3141-3,2) coumarone. These syntheses are illustrated by the following equation:

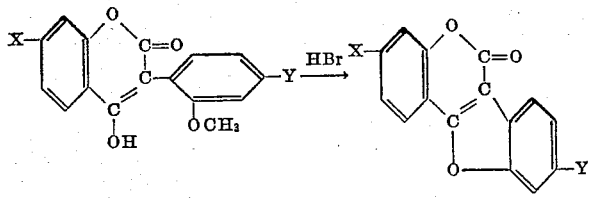

Reaction I: X is —OCH$_3$, Y is —OCH$_3$.
Reaction II: X is OH, Y is —OCH$_3$.
Reaction III: X is OCH$_3$, Y is OH.

The ethers of coumestrol have many advantages over coumestrol itself. Primarily, the ethers are more stable and can be stored for long periods without change; coumestrol tends to oxidize on storage. Moreover, the ethers are easier to isolate because they crystallize readily producing pure products characterized by sharp melting points. Moreover, it has been ascertained that coumestrol ethers exhibit essentially the same estrogenic properties, qualitatively and quantitatively, as coumestrol. That such would be the case could not have been foretold in view of the substantial difference in composition, that is, the free hydroxyl groups in coumestrol and the ether groups in the new compounds. In a matter so complex as a physiological effect on animals, it would have been expected that conversion of the hydroxy to ether groups would fundamentally alter the physiological response.

The estrogenic activity of coumestrol ethers is illustrated by the following example:

*Example II*

Estrogenic assays were conducted by feeding one lot of immature female mice with a basal ration containing coumestrol di-methyl ether. Another lot of the mice were fed the basal ration containing coumestrol. Each lot of mice contained 5 animals. In these tests each mouse was supplied with 10 grams of basal reaction containing 3 mg. of the test compound and when this feed had been completely consumed (7–8 days) the feeding period was complete. A control lot of 5 animals were fed 10 grams of the basal ration, per se.

The basal ration had the following ingredients—

| Ingredient: | Proportion, per cent |
|---|---|
| Corn meal | 75 |
| Linseed oil cake | 10 |
| Crude casein | 10 |
| Codliver oil | 3 |
| Bone ash | 1.5 |
| Sod. chloride | 0.5 |

After the feeding period was completed, the animals were slain and their uteri were excised and weighed. An increase in uterine weight denotes estrogenic activity in the material under test, the greater the increase in uterine weight over the control, the more potent the material tested.

The results of the assays are set forth below—

| Material tested | Amount fed, mg. per mouse | Average uterine weight, mg. |
|---|---|---|
| coumestrol di-methyl ether | 3 | 93 |
| coumestrol | 3 | 93 |
| contr (basalol ration) | | 9 |

It is well known in the field of animal husbandry that it is often desirable to provide animals with estrogenic preparations particularly for the purpose of increasing weight gain and increasing efficiency of feed utilization. Such effects can be obtained by adding to the regular diet a minor proportion of diethystilbestrol. Also, estrogenic agents such as diethylstilbestrol can be implanted subcutaneously in animals to obtain the desired effects. Such procedure is commonly employed with fowls. The coumestrol ethers of the invention display estrogenic properties and can be employed in place of known estrogenic compounds, as in feeds or in subcutaneous implantation, to accomplish like results of accelerating weight gain and increasing the proportion of flesh produced per lb. of feed. The coumestrol ethers constitute a source of high and uniform estrogenic potency. As a consequence they can be administered to animals in controlled dosages to obtain predetermined physiological responses. Problems of low estrogenic concentration and variable estrogenic activity as encountered in direct feeding of forage containing natural estrogenic principles are completely obviated. Moreover administration of the coumestrol ethers does not involve any physical difficulty of feeding because the ethers can be administered in feeds or other compositions the ingredients of which can be selected to be compatible with the digestive systems or other characteristics of the animals in question. Also, the coumestrol ethers can be administered by subcutaneous implantation or other techniques which require an active material free from extraneous components. Another point is that the coumestrol ethers are free from growth-inhibiting factors, saponins, or other detrimental agents naturally present in forage materials. Consequently, administration of the coumestrol ethers to animals yields the useful results of attaining desired physiological response without any undesired side effects such as growth inhibition, bloating, etc.

The coumestrol ethers of the invention may be employed in animal husbandry in the same manner as conventional with diethylstilbestrol and other known estrogenic agents. Thus the ethers may be administered by incorporating them in conventional feeds; by addition to water or other fluid; by addition to grit fed to birds; by administration in capsules, pellets or by injection; by implantation of pellets, and so forth. The amount of the ether to be administered will of course vary depending on the type of animal, the body weight thereof, the physiological response desired, and the mode of administration. For example, where the ether is administered in admixture with a feed, dosage may be that physiologically equivalent to about from 0.01 to 8 milligrams of diethylstilbestrol per 100 lbs. of body weight per day. Generally it is preferred to administer the ether by incorporating it in a conventional feed. Thus the feed may consist mainly of vegetable material such as corn, wheat, barley, milo, hay, dehydrated alfalfa or other forage material, soybean meal, cottonseed meal, distillers grains, peanut meal, oat hulls, bran, corn stalks, corn cobs, sorghum, beet pulp, or the like. For a high-energy diet a major proportion of grain or oil-seed meal is preferred. In addition to the main vegetable portion, the feed may contain the usual supplements such as mineral salts, vitamin preparations, fish meal, fish oil, linseed oil, antibiotic supplements, and so forth. In general the feed may contain on the order of 0.001 to 1 lb. of coumestrol ether per ton of feed. The coumestrol ethers may be applied for example to chickens, turkeys, geese, ducks, swine, sheep, cattle, horses, and so forth. Thereby, important practical effects are gained including increased rate of gain and increased efficiency of feed utilization. As noted above, the invention is of particularly practical value as applied to animals, such as steers, which are grown primarily for meat. Thus by application of the teachings of the invention, the animals are caused to gain weight more rapidly and produce more flesh per unit weight of feed with resulting economic benefits.

Coumestrol used as a starting material in the synthesis of the invention may be isolated from ladino clover, alfalfa, or strawberry clover by the procedures disclosed and claimed in the above-mentioned patent application Ser. No. 693,785.

Coumestrol may also be prepared by organic synthesis as described in the copending application of O. H. Emerson and E. M. Bickoff, Ser. No. 710,586, filed Jan. 22, 1958, now Patent No. 2,884,427. In this synthesis omega (2,4-dimethoxyphenyl) resacetophenone is reacted with methyl chloroformate and the product reacted with alkali to produce 3(2,4-dimethoxyphenyl)-4,7-dihydroxy coumarin. The latter compound is then heated with aniline hydrochloride to effectuate a de-methylation and a cyclization to produce coumestrol.

Having thus described the invention, what is claimed is:

1. The method for preparing a coumestrol ether which comprises reacting coumestrol with an etherification agent to produce an ether of coumestrol.

2. The method for preparing a methyl ether of coumestrol which comprises reacting coumestrol with di-methyl sulphate.

3. A method of stimulating the growth of animals which comprises administering to the animals a physiologically adequate amount of an ether of coumestrol.

4. A method of stimulating the growth of animals which comprises supplying the animals with a diet containing a physiologically adequate amount of a methyl ether of coumestrol.

5. A method of stimulating the growth of animals which comprises supplying the animals with a diet containing a physiologically adequate amount of coumestrol dimethyl ether.

6. A method of stimulating the growth of animals which comprises supplying the animals with a diet containing a physiologically adequate amount of coumestrol mono-methyl ether.

7. The method of stimulating the growth of animals which comprises supplying the animals with a diet containing a major proportion of edible vegetable material and a minor proportion of an ether of coumestrol, the proportion of the latter being sufficient to cause the animals to gain weight more rapidly and with consumption of less feed than would be the case were the animals supplied the vegetable material alone.

8. The method of claim 7 wherein the coumestrol ether is a methyl ether of coumestrol.

9. The method of claim 7 wherein the coumestrol ether is coumestrol dimethyl ether.

10. The method of claim 7 wherein the coumestrol ether is coumestrol monomethyl ether.

11. An animal feeding composition comprising a major proportion of a non-toxic, ingestible carrier material and a minor but physiologically adequate proportion of an ether of coumestrol.

12. An animal feed comprising a major proportion of edible vegetable material and a minor but physiologically adequate proportion of an ether of coumestrol.

13. The composition of claim 12 wherein the coumestrol ether is a methyl ether of coumestrol.

14. The composition of claim 12 wherein the coumestrol ether is coumestrol di-methyl ether.

15. The composition of claim 12 wherein the coumestrol ether is coumestrol monomethyl ether.

16. A method of increasing the dietary value of an animal feeding preparation containing mainly non-toxic, ingestible carrier material which comprises adding to the preparation a minor but physiologically adequate proportion of an ether of coumestrol.

17. A method of increasing the dietary value of an animal feed containing mainly edible vegetable material which comprises adding to said feed a minor but physiologically adequate amount of an ether of coumestrol.

18. The method of claim 17 wherein the coumestrol ether is a methyl ether of coumestrol.

19. The method of claim 17 wherein the coumestrol ether is coumestrol di-methyl ether.

20. The method of claim 17 wherein the coumestrol ether is a coumestrol mono-methyl ether.

No references cited.